United States Patent [19] [11] 4,379,673
Takahashi et al. [45] Apr. 12, 1983

[54] ARRANGEMENT FOR ATTACHING WORKING IMPLEMENTS TO VEHICLE

[75] Inventors: Sadayuki Takahashi; Yorio Komeda; Matsuo Tachibana; Kenkichi Nosaka, all of Sakai, Japan

[73] Assignee: Kubota Ltd., Osaka, Japan

[21] Appl. No.: 294,796

[22] Filed: Aug. 20, 1981

[30] Foreign Application Priority Data

Aug. 26, 1980 [JP] Japan .......................... 55-121694[U]

[51] Int. Cl.³ .............................................. E02F 3/72
[52] U.S. Cl. .................................... 414/686; 172/273; 414/703
[58] Field of Search ............... 414/686, 703, 723, 920; 172/272-275

[56] References Cited

U.S. PATENT DOCUMENTS 3,810,513  5/1974  Spiller et al. ........................ 172/114
3,949,889  4/1976  Moe ..................................... 414/686
4,033,469  7/1977  Frank ................................... 414/686
4,065,009 12/1977  Old ...................................... 414/686
4,181,181  1/1980  Old ................................... 172/273 X Primary Examiner—Robert J. Spar
Assistant Examiner—Terrance L. Siemens
Attorney, Agent, or Firm—Armstrong, Nikaido, Marmelstein & Kubovcik

[57] ABSTRACT

A pair of side frames, each comprising a side plate and a connecting arm, are provided on the opposite sides of a tractor body and connected together at their front ends by a connecting member. Each of the side frames has front and rear mount portions for a front loader and is removably provided at its front end with an upright frame extending upward in front of the bonnet of the tractor. The upright frame includes a mount member at the base portion thereof and an upright member removably attached to the mount member. The upper ends of the upright members are interconnected by a connector having a turnable rod extending therethrough and provided with a lift arm at each end. A front three-point linkage for attaching a front working implement to the tractor is mounted on the side frames and the upright frames. A lift cylinder is provided between the lift arm and a lower portion of each of the upright frames.

7 Claims, 8 Drawing Figures

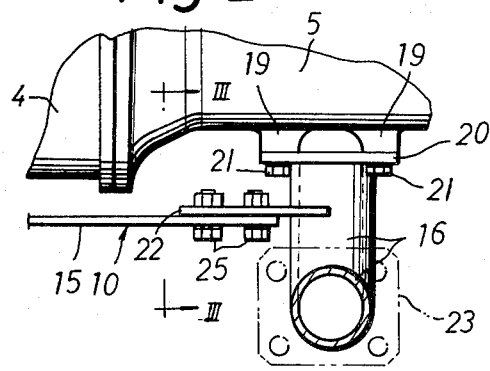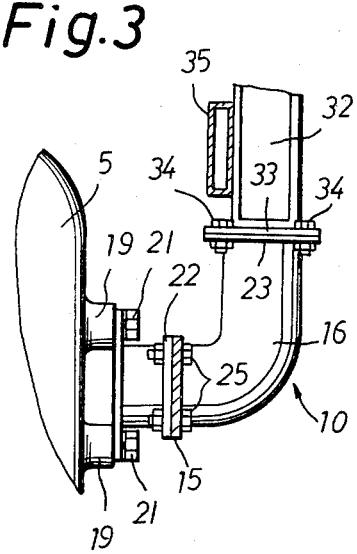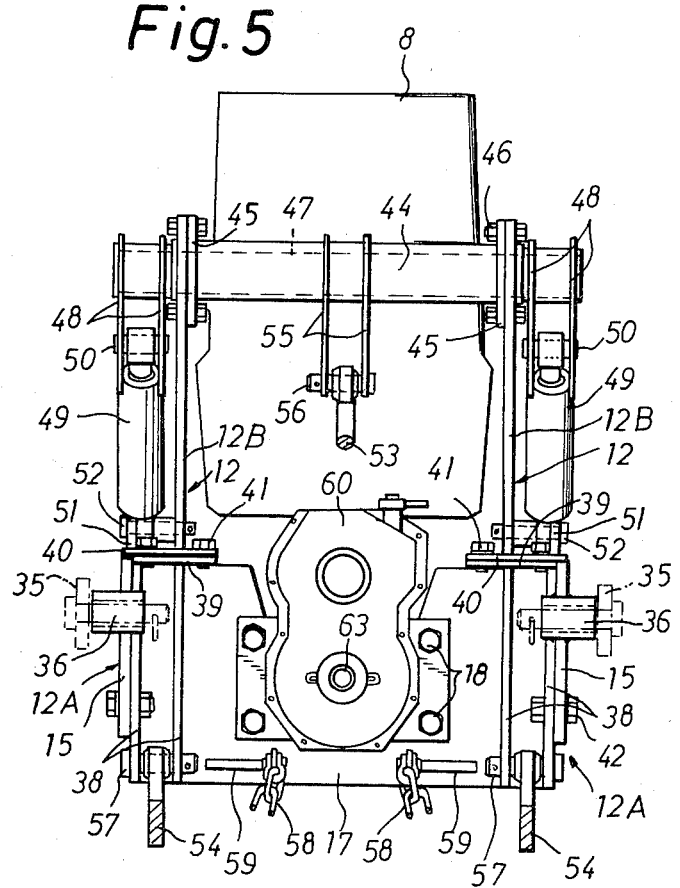

ARRANGEMENT FOR ATTACHING WORKING IMPLEMENTS TO VEHICLE

BACKGROUND OF THE INVENTION

The present invention relates to an arrangement for attaching working implements to various vehicles, such as farm tractors.

With vehicles such as farm tractors, a front loader is mountable on the vehicle body, which is further adapted to have a mower and various other front working implements attached thereto by a three-point linkage connected to the front end of the vehicle body. Since the working implement can be positioned in front of the vehicle body with use of the front three-point linkage, there is the advantage that the driver in his usual position can easily observe the operation of the implement forwardly of the vehicle. Further when mowing grass, for example, the vehicle travels where grass has already been cut down, so that the front linkage assures a greatly improved work efficiency without entailing such a problem that the uncut grass will be trod on by the wheels.

When the front loader and front three-point linkage are mounted on a farm tractor or like vehicle, mount frames must be attached to the vehicle body. Thus it is usual practice to prepare different frames for the front loader and the three-point linkage individually and to replace one frame by the other for the particular implement to be used. The need of the two different mount frames is uneconomical and involves a very cumbersome handling procedure for changing the working implements. Further since the front loader and the front three-point linkage are mounted on the vehicle body at different locations, different mount seats must be provided on the vehicle body separately. This renders the vehicle body complex in construction. Moreover, the front three-point linkage is conventionally mounted on a frame attached to a lower portion of the vehicle body, so that the frame is not usable for protecting the bonnet in the front of the vehicle body. The bonnet is therefore likely to become damaged by some obstacle during operation.

SUMMARY OF THE INVENTION

An object of the present invention is to provide a working implement attaching arrangement comprising a pair of side frames which are provided on the opposite sides of a vehicle body longitudinally thereof and which are commonly usable for mounting a front loader and a front three-point linkage on the vehicle body to render the arrangement easy to handle.

Another object of the invention is to a working implement attaching arrangement which requires only a minimized number of side frame mounting seats on the vehicle body so that the vehicle body can be simplified in construction.

Another object of the invention is to provide a working implement attaching arrangement in which upright frames disposed at the front ends of the side frames for mounting the front three-point linkage are usable for protecting the bonnet.

Still another object of the invention is to provide a working implement attaching arrangement which is partly removable easily along with the upright frames when the front three-point linkage is unnecessary.

Other objects, features and advantages of this invention will become more apparent from the following description with reference to the accompanying drawings.

BRIEF DESCRIPTION OF THE DRAWINGS

FIG. 2 is an enlarged plan view showing the rear portion of a side frame as attached in place;

FIG. 3 is a view in section taken along the line III—III in FIG. 2;

FIG. 5 is an enlarged front view of the same;

DESCRIPTION OF THE PREFERRED EMBODIMENT

Figure 1:
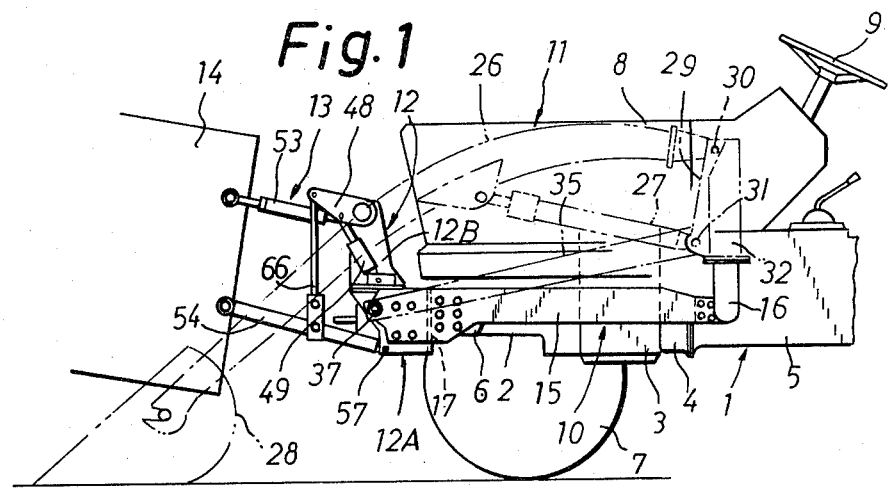
FIG. 1 is a side elevation of the front portion of a tractor with a front loader shown in phantom lines.

FIG. 1 shows a preferred embodiment of the invention as applied to a tractor. FIGS. 2 to 6 show the embodiment in greater detail. A tractor body 1 comprises a front axle support 2, an engine 3, a flywheel housing 4, a transmission case 5, etc. which are fastened together with unillustrated bolts. The front axle support 2 is provided with a front weight 6 and a front axle carrying a pair of front wheels 7. The front portion of the tractor body 1 has a bonnet 8 covering the engine 3, etc. A pair of headlamps is provided on the front side of the bonnet 8. Disposed on the rear side of the bonnet 8 is a steering wheel 9 positioned approximately in the middle of the tractor body 1 longitudinally thereof.

A pair of side frames 10 are provided on the opposite sides of the front portion of the tractor body 1 to reinforce the body 1. A front loader 11 is removably mountable on the side frames 10. A front working implement 14, such as a mower, is also removably mountable on the side frames 10 by means of upright frames 12 and a front three-point linkage 13.

Each of the side frames 10 comprises a side plate 15 disposed below the bonnet 8 and extending longitudinally of the body 1 and an L-shaped connecting arm 16. The pair of side plates 15 are connected together at their front ends by a connecting member 17, which is removably fastened to the front side of the front weight 6 with bolts 18 as seen in FIG. 14. As shown in FIGS. 2 and 3, the connecting arm 16 is laterally removably attached by a connecting plate 20 and bolts 21 to a mount seat 19 formed on the transmission case 5 and positioned approximately in the middle of the body 1 longitudinally thereof. The connecting arm 16 has a bracket 22 and is provided at its upper end with a connecting plate 23 serving as a first mount portion for the front loader 11. The side plate 15 is removably fastened at its front end to the outer side face of the front weight 6 by bolts 24 and is similarly fastened at its rear end to the bracket 22 on the connecting arm 16 by bolts 25.

The front loader 11 comprises a pair of booms 26, a pair of boom cylinders 27 for raising or lowering the booms 26 and a working member 28, such as a bucket or fork, pivoted to the front ends of the booms 26 as indicated in phantom lines in FIG. 1. The booms 26 and the boom cylinders 27 are pivoted to a pair of support members 29 by pins 30 and 31 respectively. Each of the support members 29 is removably fitted in a channel-shaped fitting portion of a connecting frame 32, which has a connecting plate 33 at its lower end. The connecting plate 33 is fastened to the plate 23 on the arm 16 by bolts 34 removably. The pairs of booms 26, boom cylinders 27, connecting frames 32, etc. are of course disposed on the opposite sides of the tractor body 1 with the bonnet 8 interposed therebetween. A reinforcing member 35 extending from the connecting frame 32 is removably attached at its front end to a boss portion 36 by a pin 37, the boss portion 36 being mounted on the front end of the side plate 15 and serving as a second mount portion (see FIGS. 5 and 6).

Figure 4:
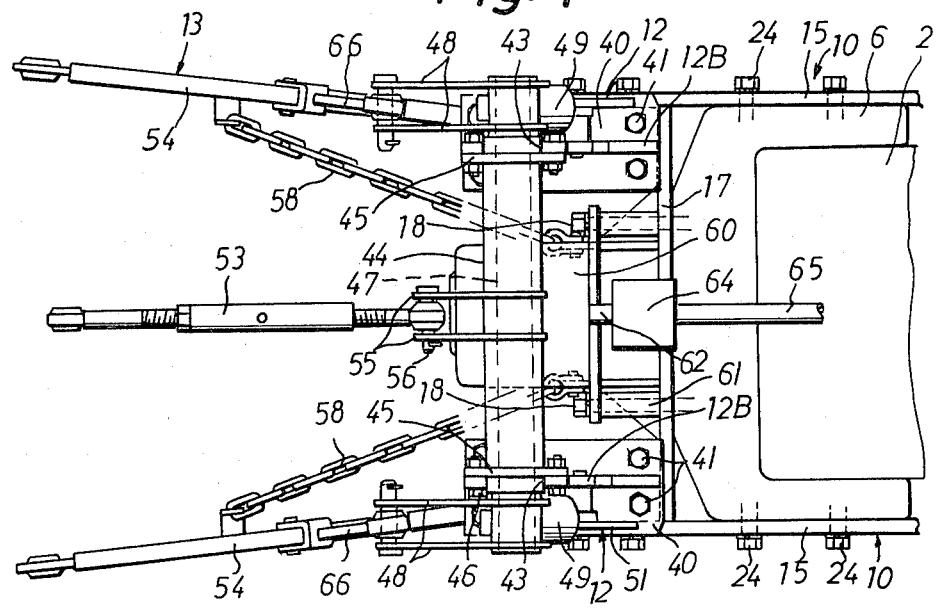
FIG. 4 is an enlarged plan view showing a front three-point linkage and other components in front of the tractor.
Figure 6:
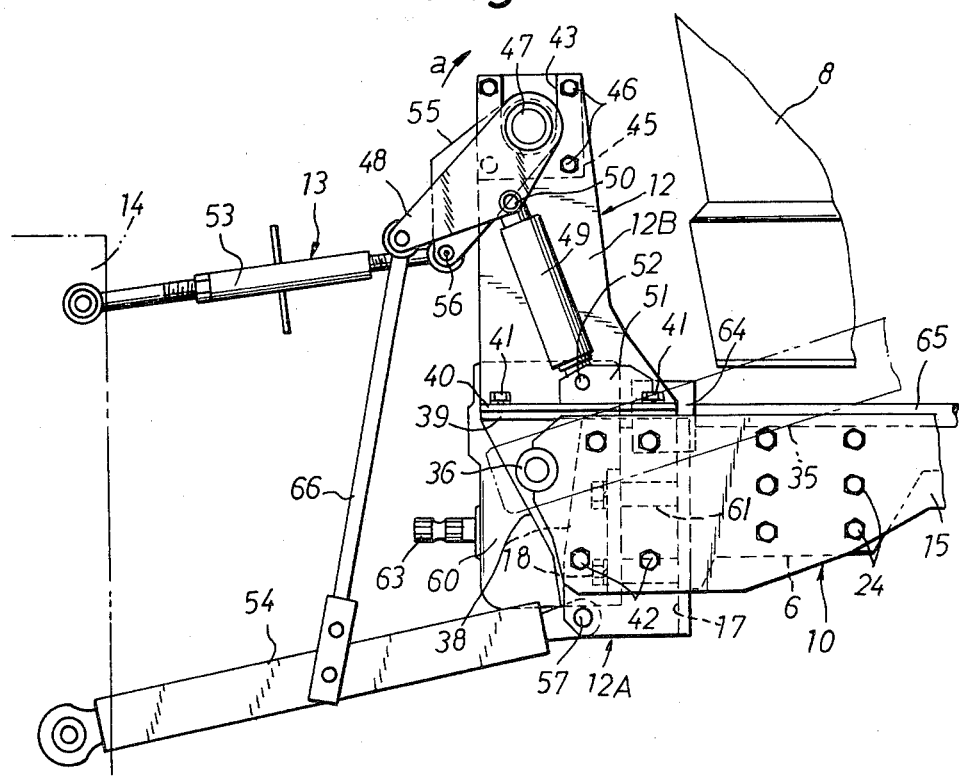
FIG. 6 is an enlarged side elevation of the same.

The pair of upright frames 12 are disposed in front of the bonnet 8 and extend upward as seen in FIGS. 4 to 6. Each of the upright frames 12 comprises a mount member 12A at its base portion and an upright member 12B separate from the mount member 12A but removably connected thereto. The mount member 12A includes a pair of fixed plates 38 attached to each end of the connecting member 17 on the front side thereof and a connecting plate 39 joined to and interconnecting the upper ends of the fixed plates 38. The upright member 12B has at its lower end a connecting plate 40 which is removably fastened to the connecting plate 39 by bolts 41. Although the connecting member 17 is fastened to the side plates 15 by bolts 42 and by means of the outer fixed plates 38 of the mount members 12A, the member 17 may be joined thereto as by welding.

The upright members 12B each have in the upper end a cutout 43 having a tubular connector 44 fitted therein. The connector 44 is fastened to the upright members 12B by flanges 45 and bolts 46. The connector 44 has a turnable rod 47 extending therethrough and having a lift arm 48 at each end thereof. The lift arm 48 is turnable upward or downward about the axis of the rod 47 by a lift cylinder 49. The lift cylinder 49 has one end pivoted by a pin 50 to the lift arm 48 and the other end supported by a pivot 52 between the lower end of the upright member 12B and a bracket 51 on the connecting plate 40.

The front three-point linkage 13 comprises a top link 53 and a pair of opposite lower links 54. The top link 53 is removably pivoted by a pin 56 to a top link mount 55 at the midportion of the connector 44. Each of the lower links 54 is similarly supported by a pin 57 between the pair of fixed plates 38. Check chains 58 for restraining the lower links 54 are detachably connected to brackets 59 on the connecting member 17.

A front power takeoff unit 60 is provided between the pair of upright frames 12 and is fastened, along with the connecting member 17, to the front side of the front weight 6 by bolts 18, with spacers 61 provided between the unit and the member 17. The power takeoff unit 60 has an input shaft 62 and an output shaft 63 and further has incorporated therein speed change means, clutch, etc. The input shaft 62 is coupled to the crank shaft of the engine 3 by a coupling 64, a transmission shaft 65, etc. The output shaft 63 is connected to the input shaft of the front working implement 14 by a universal joint.

When the front working implement 14, such as mower, is to be used as attached to the front of the tractor body 1, the implement 14 is connected to the top and lower links 53, 54 of the linkage 13 as indicated in solid lines in FIG. 1, and the input shaft of the implement 14 is connected to the output shaft 63 of the front power take-off unit 60 by the universal joint. The working implement 14 is then pushed forward in contact with the ground by the tractor while being driven by the power from the engine 3, whereby the desired operation, such as mowing, can be performed by the implement 14. During travel, the implement 14 follows the undulation of the ground. To raise the working implement 14, the lift cylinders 49 are operated for stretching. When the lift cylinders 49 are stretched, the opposite lift arms 48 are turned together by the rod 47 in the direction of arrow a in FIG. 6, causing lift rods 66 and the lower links 54 to lift the working implement 14. If the working implement 14 is of the non-driven type which does not require power, the universal joint is removed.

Before the front loader 11 is attached to the tractor body 1, the support members 29, for example, are separate from the connecting frames 32. For attachment, the connecting plate 33 of each of the connecting frames 32 is placed on the connecting plate 23 of each arm 16 and fastened thereto by the bolts 34. Each of the reinforcing members 35 is fixed at its front end to the boss portion 36 of the side plate 15 by the pin 37. After the frames 32 and the members 35 are thus attached to the side frames 10 on the tractor body 1, the tractor body 1 is moved toward the booms 26 which are so supported that the support members 29 are at a suitable level with the bucket or like working member 28 in contact with the ground, to fit the support members 29 into the fitting portions of the connecting frames 32. The support members 29 are fixed to the frames 32 by pins or the like.

Because of the above construction, the side frames 10 on the tractor body 1 are commonly usable for mounting the front three-point linkage 13 and the front loader 11. After the front working implement is used, the implement 14 is replaceable by the front loader 11 with great ease. Since the side frames 10 are thus used commonly, the number of the mount seats to be formed on the tractor body 1 can be minimized. This serves to correspondingly simplify the construction of the tractor body 1. The upright frames 12 and the connector 44 disposed in front of the bonnet 8 prevent obstacles from coming into contact with the bonnet 8 for protection while the front working implement 14 or the front loader 11 is in operation.

When there is no need to use the front three-point linkage 13, for example, when a working implement is used as attached to the rear of the tractor body 1, the upright members 12B are removed from the mount members 12A by removing the bolts 41 and separating the plates 40 at the lower ends of the upright members 12B from the plates 39 of the mount members 12A. Although the connector 44 can be separated from the upright frames 12, the lift cylinders 49, etc. must then be separated therefrom, so that it is preferable to remove the pair of upright members 12B as connected together by the connector 44 as an assembly. At this time, the lower links 54, etc. are of course removed. Thus the present arrangement is very easy to handle because the components thereof above the mount members 12A are easily removable in the form of an assembly. With the upright members 12B, etc. removed, there remains no part in front of the bonnet 8, so that the headlights are usable for forward illumination during running at nighttime.

Figure 8:
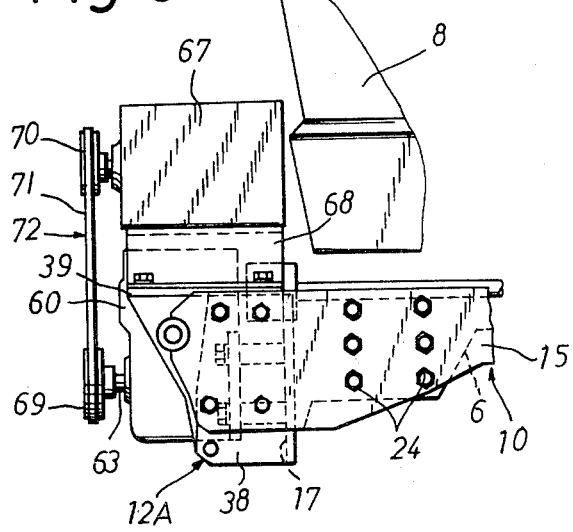
FIG. 8 is a side elevation of the same.
Figure 7:
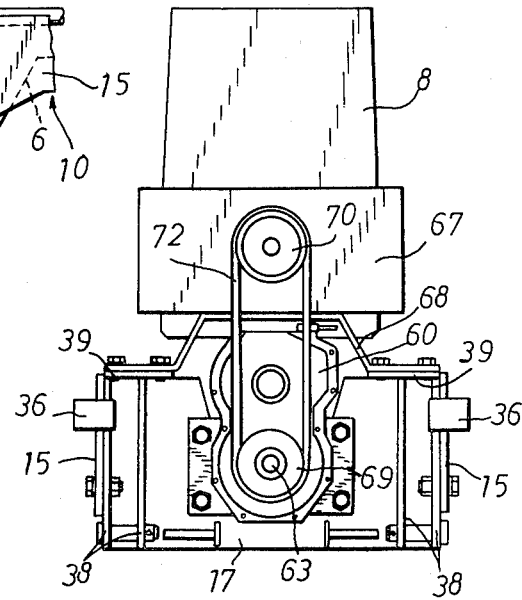
FIG. 7 is a front view showing another working implement mounted on the tractor, with the front three-point linkage and upright frames removed therefrom.

FIGS. 7 and 8 show a working implement 67, such as a power duster, mounted on the tractor with the upright members 12B removed therefrom. With the upright members 12B removed, the working implement 67 can be mounted on the tractor by a support plate 68 attached to the pair of connecting plates 39 for the application of dust, chemical solution or the like. When the implement 67 is of the power-driven type, power is delivered thereto from the output shaft 63 of the front power takeoff unit 60 by means of a wrapping connector assembly 72 including pulleys 69, 70 and a belt 71.

Although the foregoing embodiment includes the connecting plate 23 as a first mount portion for the side frame 10 and the boss portion 36 as a second mount portion therefor, such mount portions can be modified variously depending on the portions of the front loader 11 to be connected to the side frames. For example, tapered fitting portions are usable for mounting. The lift cylinder 49 may be of the single-acting type or of the double-acting type.

What is claimed is:

1. An arrangement for attaching working implements to a vehicle comprising a pair of side frames provided on the opposite sides of the body of the vehicle and extending longitudinally thereof, the side frames having mount portions for attaching to the vehicle body a front loader with a pair of booms liftable on the opposite sides of the vehicle body, each of the side frames being provided at its front end with an upright frame extending upward in front of the bonnet of the vehicle and including a mount member at the base portion thereof and an upright member removably attached to the mount member, the side frames and the upright frames being provided with a front three-point linkage for attaching a front working implement to the vehicle body and with lift cylinders for lifting or lowering the front working implement by the front three-point linkage.

2. An arrangement as defined in claim 1 wherein each of the side frames is laterally removably attached to the vehicle body at the front end of the body and also at an approximately middle portion of the body longitudinally thereof.

3. An arrangement as defined in claim 1 wherein the side frames are connected together at their front ends by a connecting member attached to the front end of the vehicle body.

4. An arrangement as defined in claim 1 wherein each of the side frames is provided with a first mount at its rear end and for connecting thereto a connecting frame of the front loader and with a second mount at its front end for connecting thereto a reinforcing member extending forward from the connecting frame.

5. An arrangement as defined in claim 1 wherein the upper ends of the upright members are interconnected by a connector having a top link mount for the front three-point linkage.

6. An arrangement as defined in claim 1 wherein the connector has a turnable rod extending therethrough, and a lift arm is fixed to each end of the turnable rod.

7. An arrangement as defined in claim 1 wherein each of the lift cylinders has one end connected to the lift arm and the other end connected to a lower portion of the upright member.

* * * * *